Figures 1, 2:
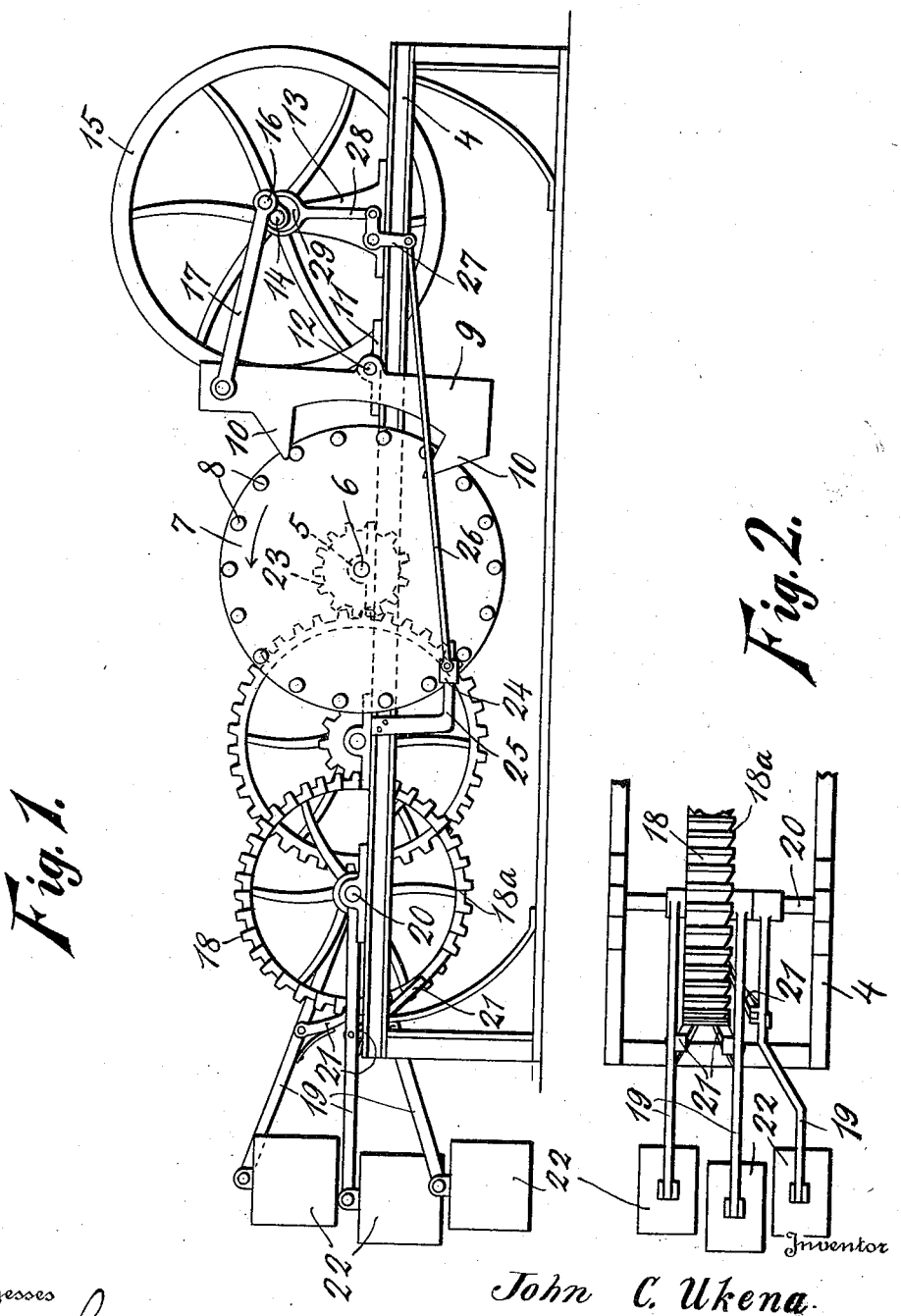

J. C. UKENA.
MOTION TRANSMITTING MECHANISM.
APPLICATION FILED APR. 24, 1914.

1,132,809.

Patented Mar. 23, 1915.

Witnesses
Einar Larson
M. C. Lucas

Inventor
John C. Ukena
By
Attorneys

UNITED STATES PATENT OFFICE.

JOHN C. UKENA, OF GOLDEN CITY, MISSOURI.

MOTION-TRANSMITTING MECHANISM.

1,132,809.

Specification of Letters Patent. Patented Mar. 23, 1915.

Application filed April 24, 1914. Serial No. 834,133.

*To all whom it may concern:*

Be it known that I, JOHN C. UKENA, a citizen of the United States, residing at Golden City, in the county of Barton and State of Missouri, have invented certain new and useful Improvements in Motion-Transmitting Mechanism, of which the following is a specification.

This invention relates to mechanism for transmitting motion, and its object is to provide an oscillatory lever which is actuated by an escapement wheel and operatively connected to a shaft by means of a crank and pitman connection, whereby the oscillations of the lever are converted into a rotary movement of the shaft.

Novel means are also provided for overcoming the dead center.

These objects are attained by means of a combination and arrangement of parts to be hereinafter described and claimed, reference being had to the accompanying drawing, in which—

Figure 1 is an elevation of the mechanism, and Fig. 2 is a plan view of a pawl-and-ratchet device.

Referring specifically to the drawing, 4 denotes a suitable base or frame which supports the mechanism. On the base are bearings 5 in which is journaled a shaft 6 carrying an escapement wheel 7 having studs 8 on its face. Coöperating with the escapement wheel is an oscillatory lever 9 having pallets 10 at its respective ends which extend into the path of the studs, and are engageable alternately by said studs, whereby the lever is oscillated. The base 4 has suitable bearings 11 supporting a shaft 12 on which the lever is fulcrumed intermediate its ends.

In bearings 13 mounted on the base 4 is journaled a shaft 14 having a balance wheel 15, and a crank 16, which latter has a pitman connection 17 with one end of the lever 9, whereby the oscillations of said lever impart a rotary movement to the shaft 14. The machinery to be driven is belted or otherwise connected to the shaft 14.

The shaft 6 of the escapement wheel 7 is driven by a weight or other motor. A gear wheel 18 is shown which is operated by ratchet levers 19 which are fulcrumed on the shaft 20 of the gear wheel and carry spring-pressed pawls 21 engaging the teeth of said wheel. To the free ends of the levers are connected weights 22 which are elevated by any suitable power and then allowed to drop, whereby the wheel 18 is driven. The ratchet levers operate in alternate order, and the gear wheel is thus given a practically continuous rotary motion. A train of gears connects the ratchet gear to a pinion 23 on the shaft 6. The width of the gear wheel is sufficient to accommodate the pawls 21 of two levers 19. The pawl of the third lever 19 engages teeth 18$^a$ on one face of the gear wheel.

Returning to the escapement mechanism, a means is provided for holding the wheel 7 stationary during the period of time the crank 16 is passing the dead center. This is necessary for the reason that a continuous uninterrupted rotary motion of the wheel 7 would not result in a rotary motion of the shaft 14, but such motion of the wheel 7 would merely rock the crank 16 back and forth, with a corresponding motion of the shaft 14. However, by momentarily arresting the motion of the wheel 7, when the crank is at the dead center, the momentum stored up in the balance wheel 15 carries the crank over the dead center. The wheel 7 is then released and one of the studs 8 strikes one of the pallets to oscillate the lever. There is sufficient space between the studs to permit the slight swing of the lever when the wheel is being held stationary and the crank is passing the dead center.

The holding mechanism comprises a slide 24 mounted on a support 25 carried by the base 4, and connected by a rod 26 to a bell-crank lever 27 fulcrumed on said base. The bell-crank lever is connected by a rod 28 to the strap of an eccentric 29 mounted on the shaft 14, whereby the bell-crank lever is rocked, and through the connection 26 the slide 24 is carried back and forth into and out of the path of the studs 8. The eccentric is set so that this movement of the slide takes place at the proper time.

I claim:

1. The combination of an oscillatory lever, a rotary member having means for oscillating the lever, driving means for said member, a shaft, a crank on the shaft, a pitman connection between the crank and the lever, and means for arresting the movement of the aforesaid rotary member as the crank passes the dead center.

2. The combination of an escapement wheel, an oscillatory lever having pallets coöperating with said wheel, a shaft, a crank on the shaft, a pitman connection between the crank and the lever, driving means for the escapement wheel, and means for arresting the movement of said wheel as the crank passes the dead center.

3. The combination of an oscillatory lever, a rotary member having means for oscillating the lever, driving means for said member, a shaft, a crank on the shaft, a pitman connection between the crank and the lever, an eccentric on the shaft, a slide for arresting the movement of the aforesaid rotary member as the crank passes the dead center, and an actuating connection between the eccentric and the slide.

4. The combination of an escapement wheel having studs on its face, an oscillatory lever having pallets extending into the path of the studs, a shaft, a crank on the shaft, a pitman connection between the crank and the lever, driving means for the escapement wheel, an eccentric on the shaft, a slide movable into and out of the path of the studs of the escapement wheel for arresting the movement of said wheel as the crank passes the dead center, and an actuating connection between the eccentric and the slide.

5. The combination of an escapement wheel, an oscillatory lever having pallets coöperating with said wheel, a shaft, a crank on the shaft, a pitman connection between the crank and the lever, driving means for the escapement wheel, an eccentric on the shaft, a slide for arresting the movement of the escapement wheel as the crank passes the dead center, and an actuating connection between the eccentric and the slide.

In testimony whereof I affix my signature in presence of two witnesses.

JOHN C. UKENA.

Witnesses:
S. W. JEWELL,
J. McLAUGHLIN.

Copies of this patent may be obtained for five cents each, by addressing the "Commissioner of Patents, Washington, D. C."